United States Patent [19]

Kitchens et al.

[11] Patent Number: 4,531,283

[45] Date of Patent: Jul. 30, 1985

[54] PORTABLE SPLICING TOOL

[75] Inventors: Roy A. Kitchens, Montgomery; Charles K. DeGroff, Wetumpka, both of Ala.

[73] Assignee: National Industries, Inc., Montgomery, Ala.

[21] Appl. No.: 491,567

[22] Filed: May 4, 1983

[51] Int. Cl.³ ............................................ B23P 19/00

[52] U.S. Cl. ........................................ 29/753; 29/755; 29/872

[58] Field of Search ................. 29/755, 745, 872, 868, 29/873, 753; 174/84 C

[56] References Cited

U.S. PATENT DOCUMENTS

| | | | |
|---|---|---|---|
| 3,605,261 | 9/1971 | Zahn et al. | 29/753 X |
| 3,636,611 | 1/1972 | Rosenbaum | 29/753 X |
| 3,783,490 | 1/1974 | Garfinkel | 29/753 X |
| 3,849,860 | 11/1974 | Zahn et al. | 29/753 X |
| 3,861,017 | 1/1975 | Garfinkel et al. | 29/753 X |
| 3,946,145 | 3/1976 | Warner | 29/753 X |
| 4,129,941 | 12/1978 | Zahn | 29/753 |
| 4,136,441 | 1/1979 | Neale, Sr. | 29/872 |
| 4,400,873 | 8/1983 | Kindig et al. | 29/753 |

*Primary Examiner*—Howard N. Goldberg
*Assistant Examiner*—Carl J. Arbes
*Attorney, Agent, or Firm*—Watts, Hoffmann, Fisher & Heinke Co.

[57] ABSTRACT

A hand held splicing gun for splicing together exposed portions of a number of wires. The gun includes a frame and a trigger actuated valve that routes compressed air to two drive cylinders mounted to the frame. A first cylinder drives a pair of forming bars against a strip of splicing material. Working in conjunction with a shear block and a forming post, the bars first shear a band from the splicing material and then bend the band into a U-shape about the wires. The second drive cylinder drives a crimping bar against the band, causing the band to bend around the wires, securing them together.

2 Claims, 11 Drawing Figures

PORTABLE SPLICING TOOL

TECHNICAL FIELD

The present invention relates to a portable splicing tool for splicing together wires to form a wiring harness.

BACKGROUND ART

Splicing machines that wrap a short piece of splicing material around uninsulated portions of a number of wires to hold the wires in place are known. Typically, after the wires are spliced, they are soldered to assure good electrical contact between the wires. In making wiring harness, for example, for the automobile industry, a large number of wires must be bundled together and spliced in desired arrangements, with some extending at angles to others. Such harnesses, e.g., couple control switches on a car dashboard to motors mounted inside the car doors which raise and lower the car windows. At a junction along the length of the harness, which after installation is located underneath the dash, wires are spliced to make the necessary corrections with switches, etc.

In the past, wires would be taken to a splicing machine, spliced in a desired arrangement, dipped in solder, and then moved to an assembly board. The assembly board is a long work bench with support pegs that hold the wires in a desired configuration, i.e., the configuration of the final harness. The subassembled spliced wires would then be placed along with other wires on the assembly board in a proper position and orientation and wrapped with tape or the like to assemble a complete harness. This practice suffers the disadvantage that it is inconvenient to splice the wires in one location and move them to a separate location for final assembly. It would be more convenient to assemble, splice, and solder the wires together, then complete the harness assembly in one location.

DISCLOSURE OF THE INVENTION

The present invention provides a light-weight portable splicing tool that can be operated at the same location that soldering and final harness assembly takes place. It is small enough to be suspended at a work area and gripped in one hand by an operator to be moved to different locations at a work bench where wires are to be spliced. The improved tool cuts a metal splicing section or band from a supply, bends it into a U-shape to fit around the wires to be spliced, and then crimps the splicing section about the wires.

A preferred portable splicing tool includes a frame, and a handle connected to the frame for gripping the tool. A movable splice forming member mounted to the frame cuts a splice band from a strip of splicing stock and forms it into a partial loop about wires placed on a crimping anvil. A crimping member also mounted to the frame then completes the splice by crimping the partial loop against the anvil and about the wires.

The frame defines a space above the anvil so that the wires can be placed against the anvil from a variety of orientations. This capability facilitates the laying out of the wire harness on a work area prior to splicing. Since subsequent to the splicing step the wire can be soldered at the same work station, the awkward and time consuming steps associated with the prior art assembly techniques are avoided.

In the preferred embodiment of the invention the forming and crimping members are individually actuated by pneumatic cylinders pressurized in response to actuation of a trigger valve. When the trigger is actuated a first pneumatic cylinder is pressurized, causing a first slide assembly to move the forming member toward the anvil, shearing the splicing band from the stock and bending it into a U-shape. The second pneumatic cylinder is coupled to the trigger valve through a delay valve which delays movement of the crimping member until the band is bent above the wires.

The forming member includes two bars oriented parallel to each other which move on either side of a pivotally mounted forming post. The two bars contact the splicing section and bend it over the forming post and into an inverted U-shape. As the bending occurs, the downward force applied on the post causes the post to pivot out of the way so that the subsequently actuated crimping member can be driven by the second pneumatic cylinder against the U-shaped band to crimp it about the wires.

Once the band has been crimped about the wires, the user deactuates the trigger valve and a return spring in the pneumatic cylinders returns the forming and crimping members to their original position. The tool is then removed from the banded wires and the wires are soldered in place on the work bench in the orientation in which they are held by the crimped band.

From the above it should be appreciated that one object of the present invention is to provide an easily portable, hand held splicing tool for splicing together exposed wire ends in a desired orientation, particularly for use in the manufacture of wiring harnesses. This and other objects, advantages and features of the invention will be better understood from the detailed description of the invention that follows, when considered in conjunction with the accompanying drawings.

BEST MODE FOR CARRYING OUT THE INVENTION

Figure 1:
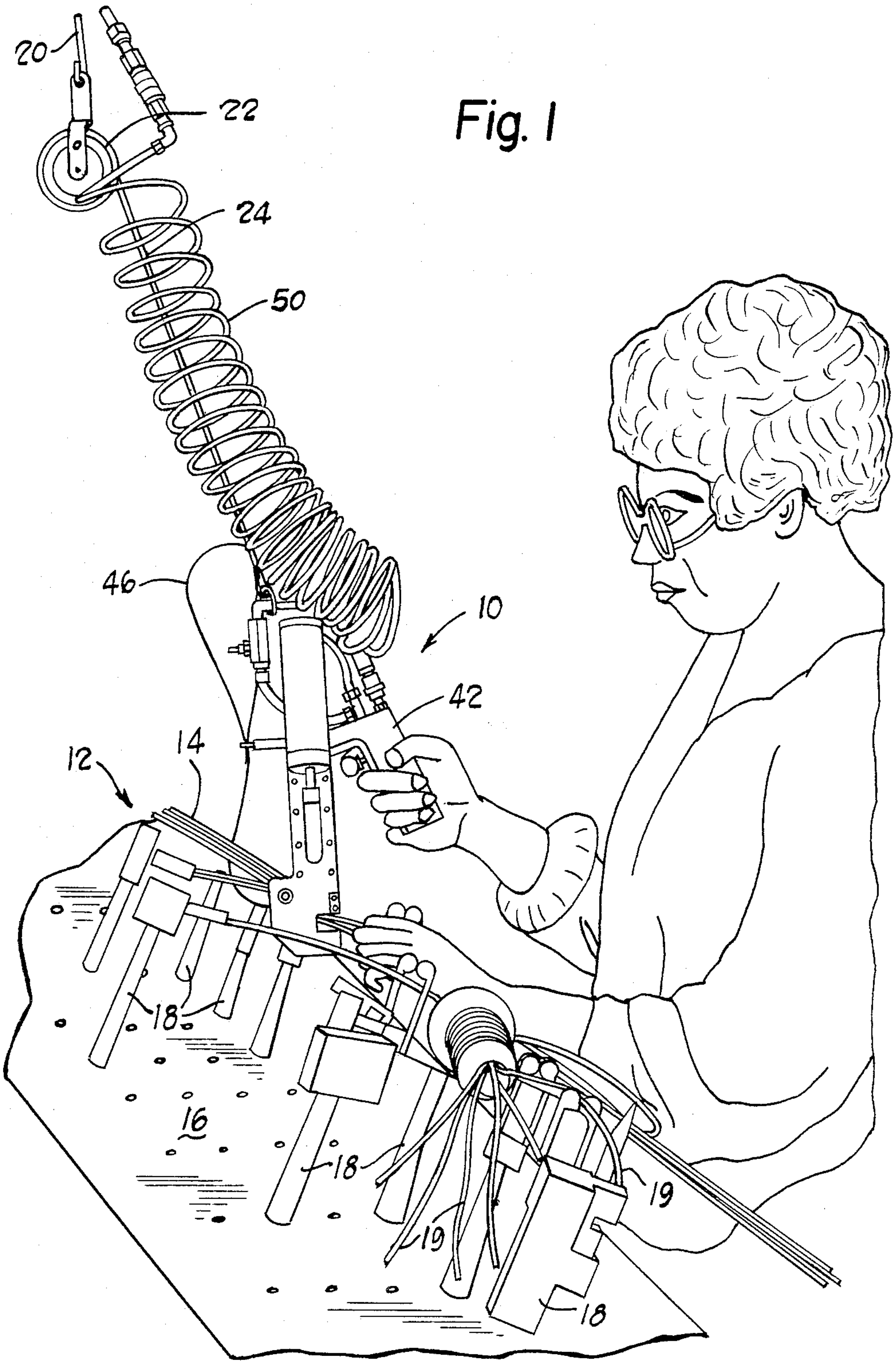
FIG. 1 is a perspective schematic showing a work station where assembling, splicing, soldering and wrapping of wire harnesses are performed.
Figure 2:
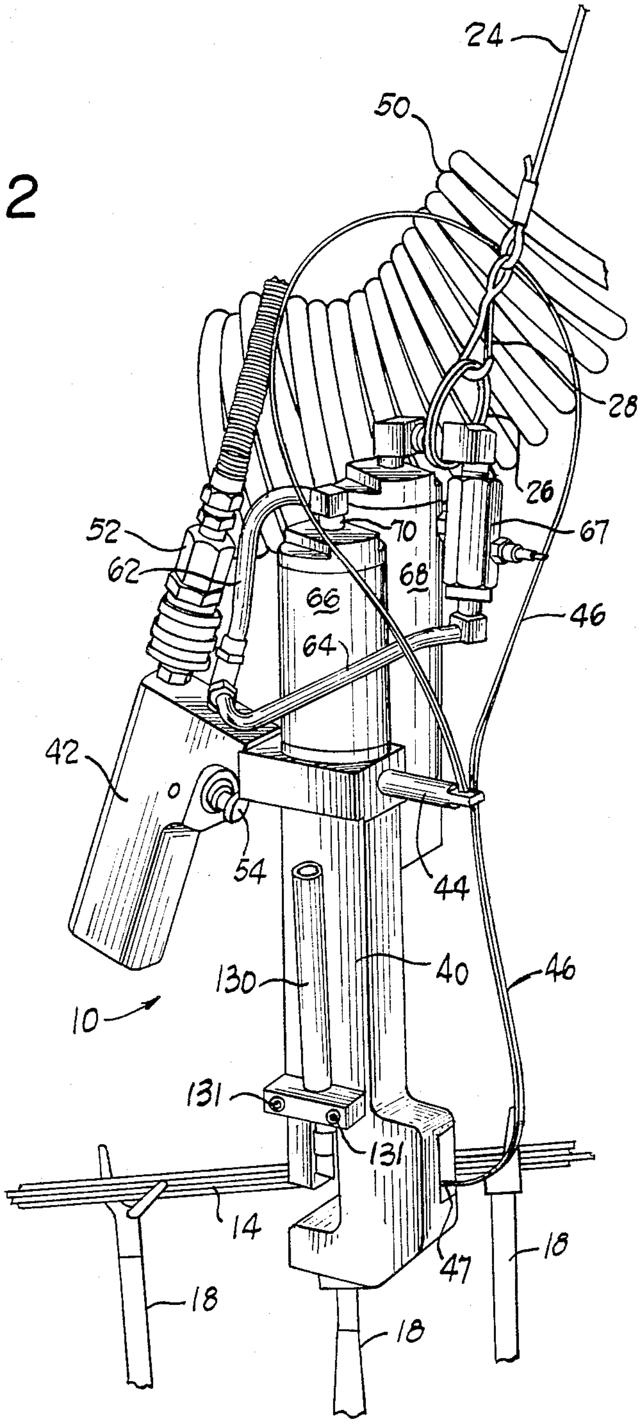
FIG. 2 is a perspective schematic of a portable splicing tool constructed in accordance with the invention.
Figure 4:
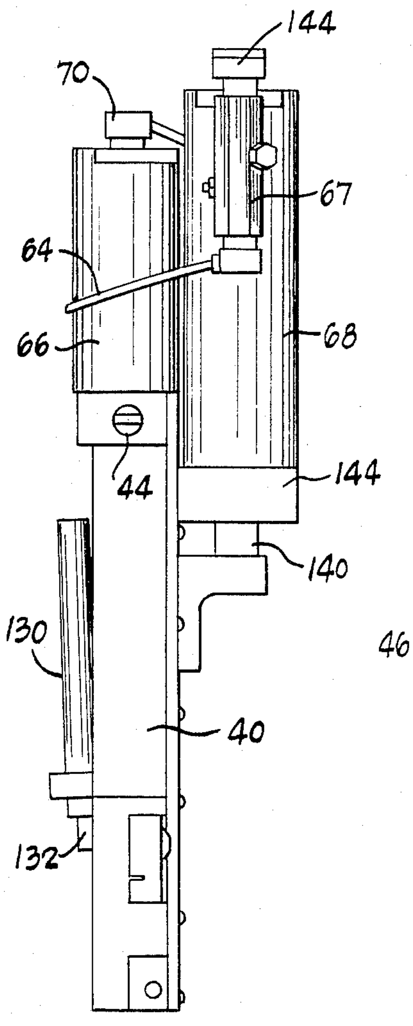
FIG. 4 is an end elevational view of the splicing tool.

Turning now to the drawings and in particular to FIGS. 1 and 2 a splicing tool 10 is shown mounted above a work station 12 where a wiring harness 14 is being assembled. The work station 12 includes a pegboard-like work bench 16. Mounted to the work bench 16 at spaced locations are support pegs 18 to which a number of wires 19, which form the harness 14, can be temporarily attached. The wires 19 typically extend in various directions from junction points in the harness. Assembling the wires 19 in these orientations can be an awkward process and the movable support pegs 18 aid the person laying out the harness in orienting the wires.

Once wires are positioned in a desired orientation, the splicing tool 10 is used in connecting or splicing together exposed or uninsulated wire portions. The tool 10 is suspended from an overhead support 20 by a counterweight 22 coupled to the splicing tool 10 by a cable 24. The cable 24 and the tool 10 are connected by a supporting ring 26 and a clip connector 28. The counterweight 22 tensions the cable 24 to allow the user to easily position the splicing tool 10. Preferably the tension in the cable 24 is such that the user need be primarily concerned with the horizontal positioning of the splicing tool 10 rather than either supporting the full weight to hold the splicing tool above the work bench 16, or having to pull the tool down with substantial force.

Figure 3:
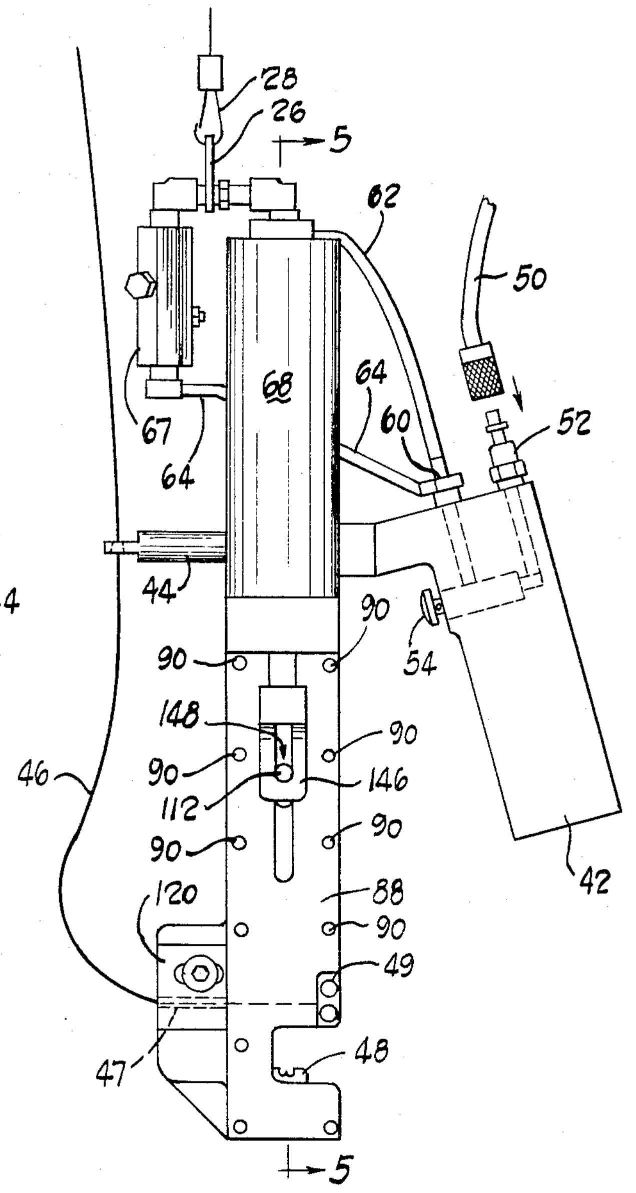
FIG. 3 is a side elevational view of the splicing tool.

The splicing tool 10 includes a frame 40, a handle 42, and a guide 44 through which a piece of splicing stock material 46 is looped. At a bottom portion of the frame 40 is an anvil 48 (FIG. 3) over which portions of wire are oriented so that a small band of the splicing stock 46 can be bent and then crimped around those exposed portions.

To splice the wires, the operator positions exposed portions of the wires over the anvil 48 and advances the splicing stock 46 through a slot 47 in the frame to a position above the wires until an end of the stock 46 abuts a mechanical stop 49. A trigger valve 54 is then actuated to couple a source of compressed air (not shown) to the splicing tool 10. The compressed air first causes two slideably mounted forming bars 56, 57 (FIG. 6) to shear and bend a splicing band over the anvil and then, after a predetermined delay, causes an independently actuated slideably mounted crimping bar 58 to crimp the band around the wires 14.

Once the wires have been crimped together, the exposed wires are soldered together with a portable soldering gun. Other wire assemblies may be added to the harness and strapped or taped together to form a completed harness. During the soldering and/or final assembly stages, the splicing tool 10 is retracted away from the work station 12 by the counterweight 22. This maneuverability allows the wires to be spliced, soldered and assembled all in one location.

A detailed construction of the splicing tool 10 is seen most clearly in FIGS. 3–6. Compressed air to activate the splicing tool is routed to the handle 42 via a coiled pneumatic cable 50 and connector 52. When the trigger valve 54 is actuated it directs compressed air to a tee connector 60 that routes the air along two flexible pneumatic tubes 62, 64. A first tube 62 directs the compressed air to a first air actuated drive cylinder 66. The second flexible pneumatic tube 64 directs the compressed air to a flow control valve 67 connected to a second air actuated drive cylinder 68.

Figure 6:
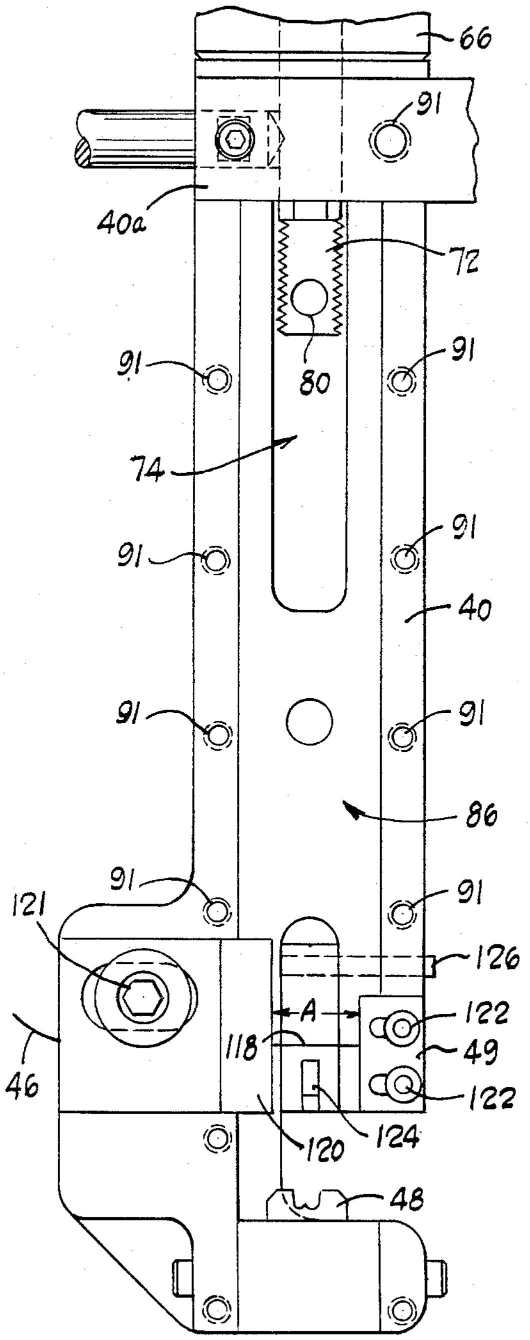
FIG. 6 is an enlarged side elevational view of the splicing tool of FIG. 3 with an exterior panel broken away.

The first cylinder 66 includes a threaded coupling 69 (FIG. 5) which engages a threaded bore 70 in a top portion 40*a* of the frame 40. A movable piston 72 extends through the bottom of the coupling 69 into a groove 74 defined by the frame 40 (FIG. 6). Compressed air reaching the cylinder 66 exerts a downward force on the piston to overcome an upward restoring force applied by a coiled retaining spring 78 inside the cylinder thereby driving the piston 72 into the groove 74.

The piston 72 defines an opening 80 for receipt of a pin 82 coupled to a splicing subassembly 84. The subassembly 84 (FIGS. 7–11) includes both the forming bars 56 and the crimping bar 58 and is positioned inside a longitudinal slot 86 (FIG. 6) defined by the frame 40. Once the subassembly 84 is inserted into the slot 86, a cover plate 88 is placed over the subassembly 84 and secured to the frame 40 by a plurality of threaded connectors 90 which mate with threaded holes 91 in the frame 40.

The subassembly 84 comprises first and second slideably engaging members which move relatively to each other in response to actuation of the first and second cylinders 66, 68. A first of these relatively movable members comprises the connecting pin 82, a mounting block 92 for that pin, a longitudinally extending plate 94 to which the mounting block 92 is secured by threaded connectors 96 counter-sunk into the mounting block 92, and finally the forming bars 56, 57.

Figure 10:
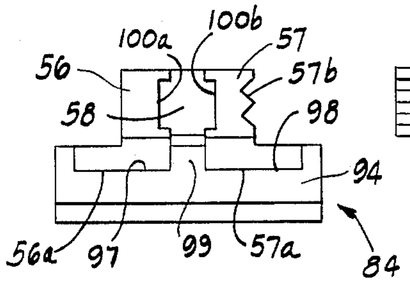
FIG. 10 is an enlarged end view of an end portion of the FIG. 7 subassembly.
Figure 11:
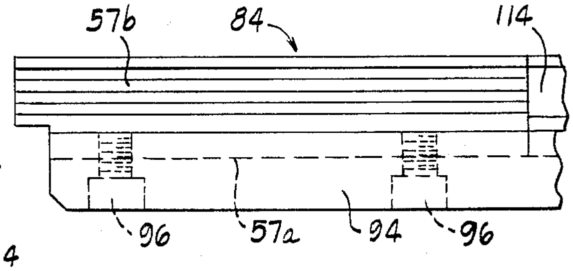
FIG. 11 is an enlarged side elevation of the portion shown in FIG. 10.

The forming bars 56, 57 are preferably individually attached to the plate 94 by threaded connectors 96 and define generally L-shaped members having flat surfaces 56*a*, 57*a* (FIG. 10) abutting the mounting plate 94. It is seen in FIG. 10 that the plate 94 includes two grooves 97, 98 separated by a land 99. The two bars 56, 57 fit in the grooves so that when mounted in place, they define a narrow slot 100 having inner surfaces 100*a*, 100*b* through which the crimping bar 58 moves in response to the driving action of the second cylinder 68.

The second member of the splicing subassembly 84 comprises the crimping bar 58, a generally U-shaped block 110 to which the bar 58 is pinned with a pin 111, and a larger link pin 112 welded to the block 110. During construction of the subassembly 84, the link pin 112 is inserted through an elongated slot 113 in the plate 94 and the two forming bars 56, 57 are connected to the plate 94 with a rail 114 on the crimping bar 58 extending through and guided by the slots 100 defined by the two inner surfaces 100*a*, 100*b* of the forming bars 56, 57.

When so constructed, the crimping bar 58 is free to slide between the forming bars 56, 57. One end 113*a* of the slot 113 limits movement of the pin 112 in one direction and in the other direction of movement, top surfaces 56*c*, 56*d* of the forming bars contact a bottom 110*a* of the U-shaped block 110. Within these constraints, the crimping bar 58 is free to slide relative to the forming bars with the rail 114 guided by the slot 100 between the forming bars 56, 57.

The splicing subassembly 84 fits in the frame 40 so the pin 82 extends into the opening 80 of the piston 72. Actuation of the first cylinder 66 by compressed air causes downward movement of the pin 82, mounting block 92, plate 94, and forming bars 56, 57. The forming bars 56 contact the stock 46 and a portion or band 118 of splicing material is sheared from the stock.

The length of the band 118 is dependent upon the distance "A" (FIG. 6) between a shear block 120 and the mechanical stop 49. This separation distance is adjustable, since the position of both the stop 49 and shear block 120, relative to the frame 40 can be modified. To position the shear block, a connector 121 is loosened, the shear block 120 repositioned within a slot in the frame, and then the connector 121 retightened. Similarly, two connectors 122 which secure the stop 49 to the frame can be loosened and the position of the stop adjusted. This adjustment allows various diameter wires to be crimped or alternately allows the number of wires connected in a given splice to be altered.

The shear block 120 and forming bar 57 have conforming surfaces 57*b,* 120*a* which mate to align the forming bar 57 as it moves downward into contact with the band 118 of splicing material. As seen most clearly in FIG. 10, the surface 57*b* has a "W" cross section which meshes with a similar cross section on the surface 120*a.*

Once the forming bars (working in concert with the shear block 120) have sheared the band 118 from the stock they bend the band 118 around a forming post 124. The slot 100 defined by the inside surfaces 100*a,* 100*b* of the forming bars 56 guides the splicing band as it is bent into a U-shape around the forming post.

The forming post 124 is pivotally mounted to the frame 40 by a pin 126 (see FIG. 5) and is biased into a position above the anvil 48 by a spring 128 compressed inside a cylindrical housing 130 mounted to the frame 40 with threaded connectors 131. The spring 128 exerts a force on a cylindrical piston 132 which contacts a ledge 124*a* of the forming post. As the bars 56, 57 continue their downward movement they exert a force through the band 118 to the forming post 124 to overcome the restoring force of the compressed spring 128. The forming post pivots about the pin 126 away from its position above the anvil 48.

The slot 100 between the bars 56, 57 prevents lateral movement of the band as the forming post 124 pivots out of the way and downward movement continues until the form bars 56 come into contact with the anvil 48. In this extreme downward position the form bars bound the wires 19 to be spliced as well as the U-shaped band 118 of strip stock.

Figure 5:
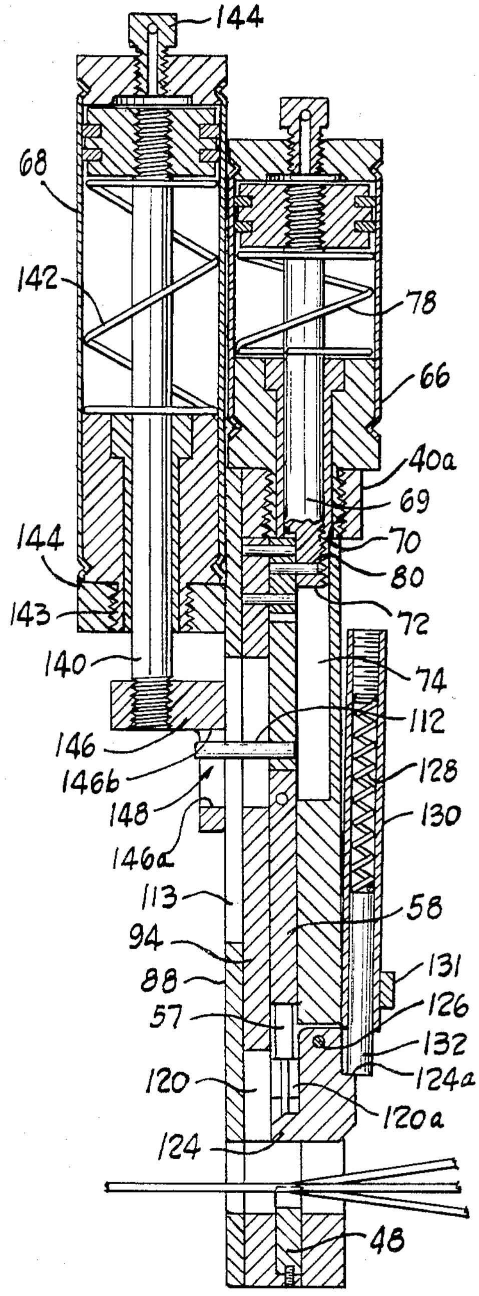
FIG. 5 is a sectional view taken along the line 5—5 in FIG. 3.
Figure 7:
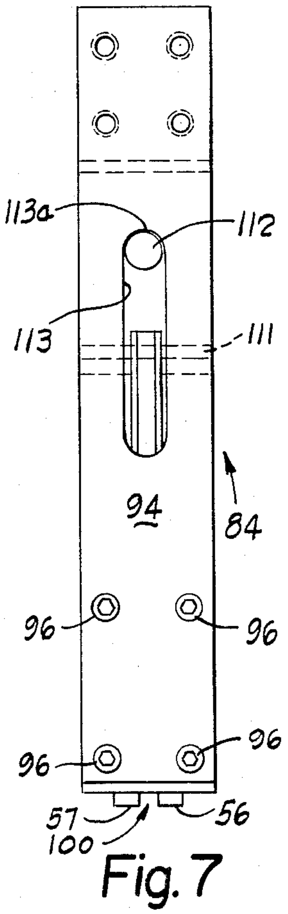
FIG. 7 is an elevation view of a splicing subassembly mounted in a frame of the splicing tool.
Figure 8:
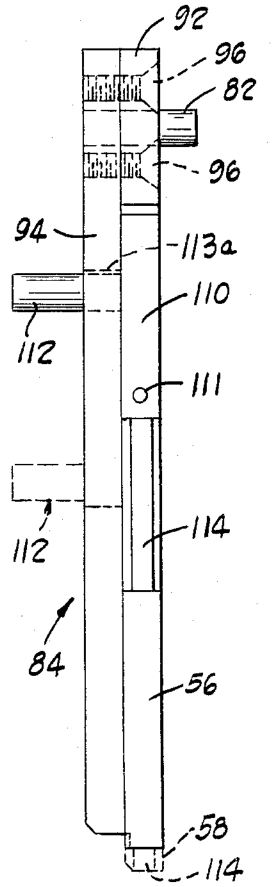
FIG. 8 is a side elevation view of the subassembly.
Figure 9:
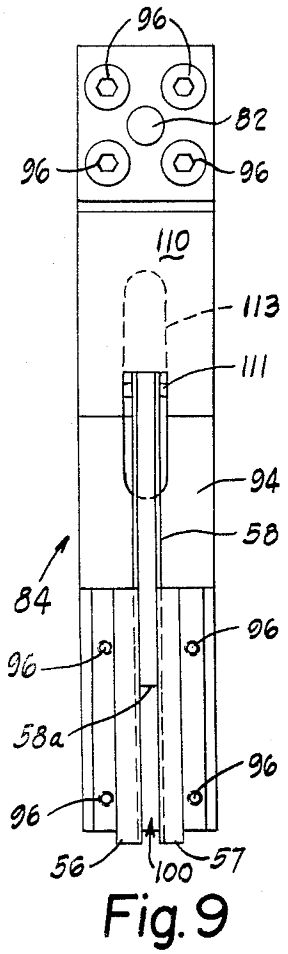
FIG. 9 is an elevation view of a reverse side of the subassembly.

Thus far, the crimping bar 58 has not contacted the band of strip stock. The crimping bar 58 is driven against the band 118 by the second drive cylinder 68. The second cylinder 68 has its own piston 140 and coiled retaining spring 142 (FIG. 5). The flow control valve 67 delays pressure buildup at a coupling 144 on the second cylinder 68 so that downward movement of this second piston 140 is delayed until the band 118 of strip stock has been bent and the forming post 124 pivoted out of the way.

The second cylinder 68 is mounted to the cover plate 88 by a threaded coupling 143 that engages a threaded opening in a mounting bracket 144 screwed to the cover plate 88. The piston 140 is threaded at its end so that it can be coupled to a lost motion bracket 146 which abuts the cover plate 88. The bracket 146 defines a slot or through passage 148 through which the pin 112 coupled to the crimping bar 58 extends when the subassembly 84 has been mounted inside the frame 40.

During downward motion of the forming bars 56, the pin 112 and connected crimping bar 58 are free to move until the pin 112 contacts a bottom 146*a* of the groove 148 in the bracket 146. When contact between pin 112 and the bracket 146 occurs, downward movement of the crimping bar 58 stops until the piston 140 begins its downward movement in response to compressed air passing through the delay valve 67. The crimping bar 58 moves toward the anvil 48 when the pistion 140 drives the lost motion bracket 146 relative to the frame 40.

As the bracket 146 moves, the pin 112 rides on the surface 146*a* until the crimping bar 58 contacts the U-shaped band 118. The bracket 146 continues to move until the pin 112 is contacted by a top surface 146*b* of the groove 148. Continued movement of the piston 140 and bracket 146 drives the crimping bar 58 against the bent band 118 of strip stock and forces ends of the band 118 into two depressions 150*a,* 150*b* in the anvil causing the band to bend first inwardly and then up around the wires 19. A bottom surface 58*a* of the bar 58 is curved so that the band 118, when crimped, resembles a staple with a rounded top surface. This shape securely fastens the wires 19 without breaking or unnecessarily deforming them.

Once the splicing operation has been completed, the operator releases the trigger valve 54 and the two retaining springs 78, 142 retract the crimping 58 and forming bars 56, 57 to their initial starting positions. As the bars 56, 57 move away from the anvil the spring 128 again biases the forming post 124 back into position above the anvil 48 for the next splice. The user withdraws the spliced wires 19 and either moves on to crimp together other exposed wires or begins the process of soldering to insure good electrical contact between the crimped wires.

The present invention has been described with particularity. It should be appreciated, however, that certain modifications and/or alterations could be made in the disclosed apparatus without departing from the spirit or scope of the invention set forth in the appended claims.

What is claimed is:

1. A portable hand-held splice tool for joining wires by crimping a splice band around a plurality of wires, comprising:

a frame;

a handle connected to the frame for maneuvering said splice tool;

a crimping anvil on the frame;

parallel forming bars spaced laterally and movable longitudinally on the frame relative to the anvil between first and second positions for shearing a splice band from strip stock extending into the frame laterally of the bars and for moving the band to the anvil;

a forming post carried by the frame with a portion located between said first and second positions and constructed to fit between the bars;

a crimping member on the frame located between and movable longitudinally of the bars toward and away from the anvil; and two single-acting pneumatic cylinders, one connected to said forming bars and the other to said crimping member, for moving the bars and member toward and away from the anvil in a predetermined sequence;

flow control means for operating said cylinders and for delaying operation of the cylinder that moves the crimping member relative the cylinder that moves the forming bars; and a retractable suspension for said tool, said suspension including means to counterbalance the weight of said tool.

2. A portable hand-held splice tool for joining wires by crimping a splice band around a plurality of wires, comprising:

an elongated frame;

a handle connected to one end of the frame for maneuvering said frame in relation to the wires;

a crimping anvil mounted to an opposite end of the frame, said frame and anvil defining a splice opening into which said wires are inserted for crimping, said splice opening facing in the same general direction as the handle extends from the frame;

means carried by and movable relative to the frame for forming a splice band into a partial loop and for subsequently crimping the partial loop against the anvil about wires positioned on the anvil;

first and second air actuated drive cylinders carried by the frame to impart separate motion to said means for forming and crimping;

valve means connected to said handle for selectively routing air to said first and second drive cylinders;

means mounted to the handle in fluid communication with the valve means to couple a source of compressed air to the air cylinders;

a valve actuator mounted to a surface of the handle facing the splice opening to allow an operator to actuate crimping of the wires while positioning the tool in relation to the wires; and a retractable suspension having a counterbalance for facilitating the maneuvering of said tool in relation to said wires.

* * * * *